United States Patent

Prochnow

[15] 3,666,894

[45] *May 30, 1972

[54] DEVICE FOR THE RECORDING AND PLAYBACK OF SIGNALS ON MAGNETIC TAPE

[72] Inventor: Rudolf Prochnow, Darmstadt-Eberstadt, Germany

[73] Assignee: Fernseh GmbH, Darmstadt, Germany

[ * ] Notice: The portion of the term of this patent subsequent to July 6, 1988, has been disclaimed.

[22] Filed: Jan. 19, 1971

[21] Appl. No.: 107,644

Related U.S. Application Data

[63] Continuation of Ser. No. 786,872, Dec. 26, 1968, Pat. No. 3,591,732.

[52] U.S. Cl. ....................179/100.2 T

[51] Int. Cl. ....................G11b 5/50

[58] Field of Search ....................179/100.2 T; 178/6.6; 340/174.1 D; 310/42, 90, 209

[56] References Cited

UNITED STATES PATENTS 3,591,732 7/1971 Prochnow ....................179/100.2 T

*Primary Examiner*—Bernard Konick
*Assistant Examiner*—Robert S. Tupper
*Attorney*—Ernest F. Marmorek

[57] ABSTRACT

A head-wheel, carrying recording and pick-up heads for a magnetic tape recording and play-back system, is mounted on the rotor shaft of a drive motor, together with rotatable electric signal transfer means to constitute a rotor assembly which can be, as a unit, axially separated from the stator of the drive motor for the rotor assembly. The rotatable signal transfer means of the rotor are disposed in proximity of the head-wheel and have a stepped bearing dimension fitting into the supporting bearing of cooperating stationary signal transfer means of the stator.

5 Claims, 4 Drawing Figures

Patented May 30, 1972

3,666,894

2 Sheets-Sheet 1

Inventor:
Rudolf Prochnow by [signature]
Attorney.

Patented May 30, 1972 3,666,894

2 Sheets-Sheet 2

Inventor:
Rudolf Prochnow by [signature]
Attorney

DEVICE FOR THE RECORDING AND PLAYBACK OF SIGNALS ON MAGNETIC TAPE

This is a continuation of my application Ser. No. 786,872, filed Dec. 26, 1968, now U.S. Pat. No. 3,591,732.

The invention relates to a device for the recording and playback of signals on magnetic tape. The device embodies a head-wheel which carries the magnetic heads, and the head-wheel is mounted on the shaft of a head-wheel motor which rotates the head-wheel and the magnetic heads carried thereby.

The device is also equipped with signal circuitry and transmitters which transfer the signals between the rotating and the stationary portions of the device. To maintain the device in proper operating position during rotation, the device is provided with means for the controlling of the axial and the radial positioning of the rotor shaft.

In the case of magnetic tape devices which are designed especially for the recording and playback of video signals and which employ a head-wheel carrying, for example, four magnetic heads, said magnetic heads get worn out relatively fast. Concurrently the lifetime of such magnetic heads can be estimated as ranging from 150 to 200 hours. Through apparently even minor causes in the operation, magnetic heads can become unusable even after a shorter time period. A present conventional type of head-wheel unit comprises a base or mounting plate, a head-wheel motor with a head-wheel disc and magnetic heads, a head-shoe guiding device, a control track head, an impulse transmitter, etc. When a replacement is necessary, usually the entire head-wheel unit is returned to the manufacturer for repair purposes, since difficult and extensive adjustments are necessary which cannot be made by the customer, by merely substituting new heads.

In addition to the fact that the customer must keep a stock of complete head-wheel units on hand for substitution purposes, a further disadvantage of this conventional form of construction is that the substitution of a complete head-wheel unit is relatively time-consuming, and is also difficult to perform, due to the adjustments which still have to be made locally as part of these substitution operations.

One object of the present invention is to provide a magnetic tape device of novel construction, in which the foregoing disadvantages are avoided.

Another object of this invention is to provide a device of the foregoing type, which is designed and constructed to permit easy assembly of a complete rotor unit with a head-wheel into a motor stator, and to permit easy disassembly by withdrawal of the complete rotor unit from the stator when a substitution is to be made for a worn-out set of magnetic heads.

The invention is shown as embodied in two modifications. In one modification the head-wheel for the magnetic heads is mounted at the front end of the rotor shaft, and signal transfer means are disposed at the rear end of the rotor shaft. Circuit conductors connected between the magnetic heads and the signal transfer means are deposed in an axial bore in the shaft. To permit insertion of the rotor unit as a complete assembly, the stator structure is provided with stepped bearings.

Thus, in accordance with the present invention, a first radial supporting bearing for the rotor shaft is provided between the head-wheel and the rotor shaft, where the diameter of said first rotor shaft supporting bearing is at least equal to the diameter of the rotor, to permit axial insertions of the rotor as a whole.

A second radial rotor shaft supporting bearing is provided on the other end of the supporting stator structure, where the diameter of said second rotor shaft supporting bearing, at the most, equals the diameter of the rotor. A third rotor shaft thrust bearing is provided in the vicinity of the head-wheel, with said third rotor shaft bearing working together with a counter-bearing and acting radially with respect to the rotor shaft; this third rotor shaft bearing can be moved by choice from its operating position into a second or non-operating position which releases the rotor shaft, so that the rotor of the head-wheel motor — together with the head-wheel which is affixed thereon and the component parts of the transmitters which are arranged on the rotor shaft — can be removed as a unit from the stator of the head-wheel motor.

The advantage of this magnetic tape device, which is designed in accordance with the present invention, lies therein that the magnetic heads can be exchanged within a very short time period, for instance in about 10 seconds, whereas the exchange of a complete conventional head-wheel unit is more time-consuming and can take up to 5 minutes. Here no additional adjustments are necessary, since the tolerance accuracy of the manufacture of the individual component part has to be within certain tolerance limits to permit random assembly of the rotors and stator structures. Furthermore, the form of construction in accordance with the present invention is advantageous from an economical view point, since now only a portion of the initially referred to complete head-wheel motor units need be kept on hand by the customer.

In one exemplified embodiment of the present invention, the rotatable portion of the transmitter or signal transfer means is mounted on the rotatable portion of the first rotor shaft bearing, and the associated stationary portion of the transmitter is affixed to the stationary portion of the rotor shaft supporting bearing, whereby the air gap is symmetrically disposed between the rotatable and the stationary portions of the transmitters.

In an advantageous manner, the rotor shaft end thrust bearing, which prevents the rotor shaft from axial displacement, consists of a ball-thrust bearing, which is supported on a pivotable arm and is disposed to press against the axial end of the rotor shaft in the immediate vicinity of the head-wheel.

A counter-bearing is thereby formed through the bearing which operates axially between the head-wheel and the front side of the head-wheel motor.

By way of the exemplified embodiments with are illustrated in FIGS. 1–4, the present invention is discussed in greater detail in the following description, wherein only those component parts are illustrated which are necessary for the full understanding of the present invention. In the figures which are shown in the attached drawings, similar component parts are identified by similar reference numerals.

Figure 1:
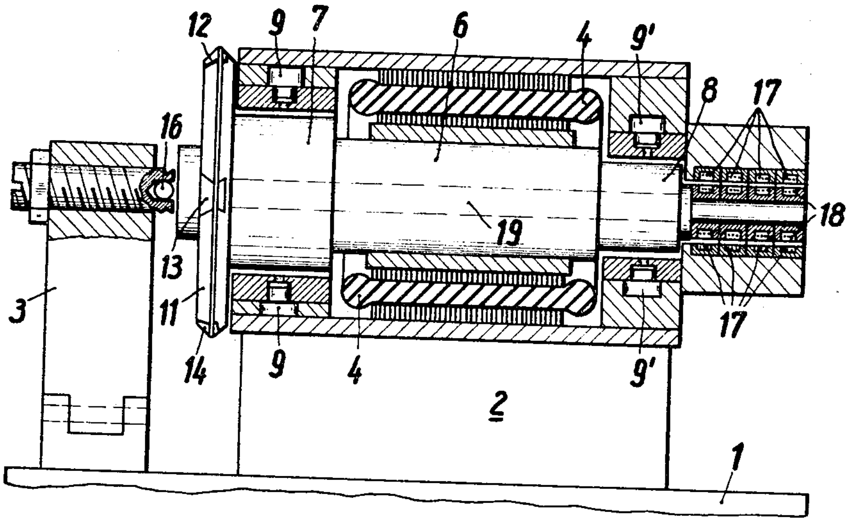
FIG. 1 is a fragmentary longitudinal vertical sectional view of a head-wheel unit designed in accordance with the present invention.

The head-wheel motor 2 and a swivel arm 3, which supports a rotor shaft thrust bearing 16 to restrain the rotor shaft from axial displacement, are mounted on a base or mounting plate 1. The head-wheel motor 2 comprises a stator winding structure, and a rotor 6 which is arranged on the rotor shaft. The rotor shaft 6 is supported at both ends in a floating manner by means of the rotor shaft end bearings 7 and 8, in associated air-type supporting bearings. Through the openings 9 and 9', air is introduced into the two associated rotor shaft supporting bearings. At the front end of rotor shaft 6, a head-wheel 11 is attached, which carries four magnetic heads 12, 13, 14 and 15. A swivel arm 3 is equipped with a ball type thrust bearing 16, which presses axially against the end of the rotor shaft 6.

In the exemplified embodiment illustrated in FIG. 1, four rotatable signal transmitters are arranged at the other end of the rotor shaft. Said transmitters consist of a stationary portion 17, on the stator structure, and of a movable portion 18 which is disposed on the rotor shaft and rotates along with the latter.

The rotor shaft is provided with an axial bore to accommodate the feed-lines which lead from the heads on the head-wheel 11 to the transmitters 18 through shielded lines 19.

Figure 2:
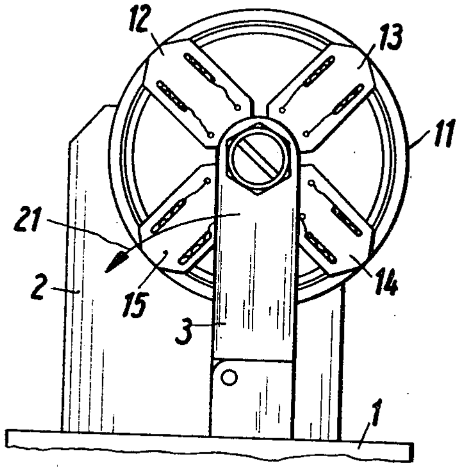
FIG. 2 is an end view of the head-wheel unit in FIG. 1.

In the case of the magnetic tape device which is designed in accordance with the present invention, when exchanging the magnetic heads it will only be necessary to swing the swivel arm 3 in the direction indicated by arrow 21 (FIG. 2), away from operative position, after which action the rotor 6 of the motor 2 can be withdrawn from the stator together with the head-wheel 11 and the associated transmitters 18 or 18'.

Figure 3:
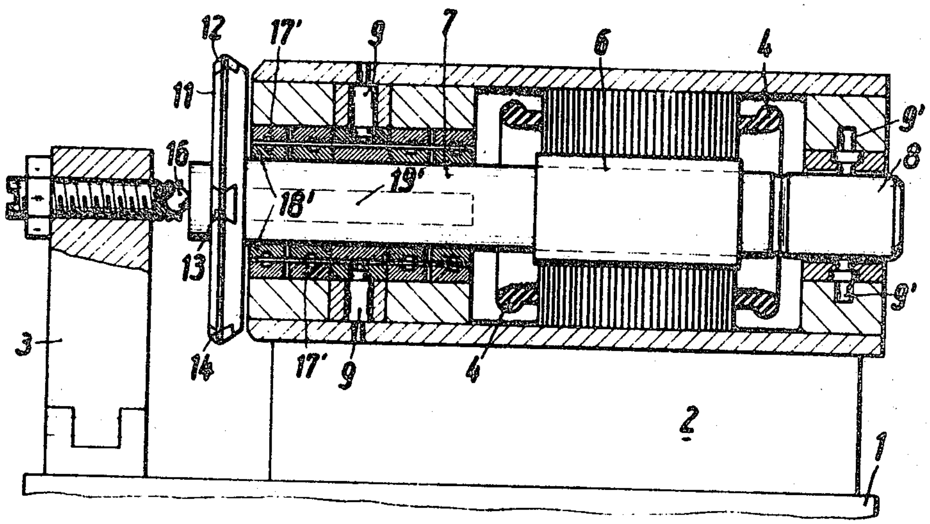
FIG. 3 is a fragmentary longitudinal vertical cross-sectional view of a modified head-wheel unit.
Figure 4:
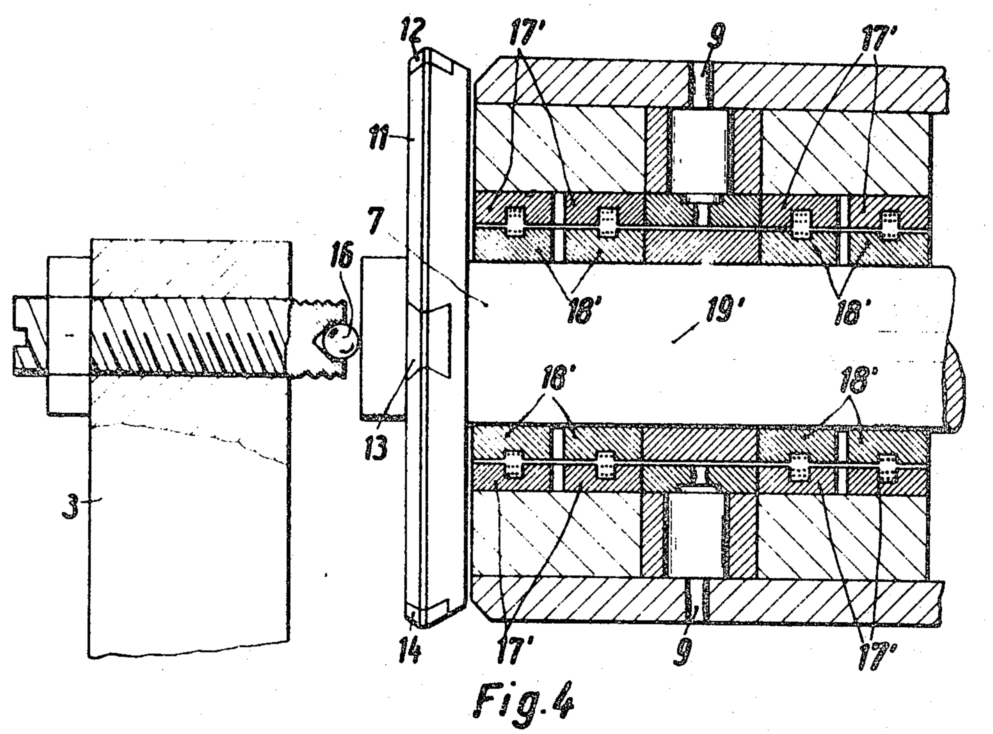
FIG. 4 is a large scale fragmentary sectional view of a portion of the head-wheel unit of FIG. 3.

In the other exemplified embodiment of the present invention which is illustrated in FIGS. 3 and 4, the transmitters — consisting of the stationary portion 17' and of the movable portion 18' which is arranged on the rotor shaft — are mounted in the immediate vicinity of the head-wheel 11 at the rotor shaft front bearing 7, whereby the air bearing gap extends between the stationary portion 17' of the transmitters and the revolving portion 18' of the transmitters. This type of construction has a further advantage that the conductor lines 19' between the head-wheel 11 and the transmitters 17' and 18' can be kept very short.

The invention herein disclosed shows a simple motor assembly of rotor and stator, in which the rotor, which carries the recording and playback heads and associated signal transfer means, may be easily removed from assembled operating condition in the stator when a replacement is to be made. Similarly, a replacement may be easily made by axial insertion of a rotor and then locked in operating position against undesired axial displacement.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A device for the recording and playback of signals on magnetic tape, comprising a motor having a stator structure supported on a base, and a rotor having a shaft operably and axially insertable and positionable concentrically into and within said stator structure, and axially shiftable for removal from said stator structure; said stator structure embodying a cylindrical winding structure disposed concentrically around a central axis of rotation of the motor; with an end bearing disposed and supported co-axially at each end of said stator structure to support the rotor shaft, one of said two bearings being located at the front end of said stator structure and having a larger open inner bearing diameter to permit the insertion of the rotor, and the other of said two bearings being located at the back end of said stator structure with an inner diameter to receive the corresponding back end of the rotor shaft; said rotor shaft having a small stepped bearing at its back end to fit said back stator bearing, and the front end of the rotor shaft having a stepped bearing dimension appropriate to fit operably in said front end bearing of said stator structure; head wheel means mounted co-axially at the front end of said shaft and serving to carry a plurality of magnetic heads for engaging an external magnetic tape; and rotatable electric signal transfer means supported on a peripheral region of said rotor shaft to be rotated in a circular path concentric to said operating axis and to transfer signal energy between said rotatable signal transfer means and cooperating stationary signal transfer means supported on said stator structures; said rotatable signal transfer means being disposed in close proximity of said head-wheel means and having a stepped bearing dimension appropriate to fit operably in said front end bearing of said stationary signal transfer means; all of said rotor structure being thereby axially shiftable as a unit into working position into and between the bearings, to place the head-wheel in operative position, and said rotor structure being conversely removable as a unit by axial shifting from working position when the magnetic heads are to be replaced.

2. A device for recording and playback of signals, as in claim 1, in which said bearings support the rotor concentrically during operation to maintain a uniform cylindrical gap between the signal transfer means, on the rotor and the cooperating means on the stator structure.

3. A device for recording and playback of signals as in claim 1, in which said bearings on the stator structure are arranged to be operated as air bearings to air-support the rotor shaft in symmetrical co-axial position during operation.

4. A device for recording and playback of signals, as in claim 1, comprising further, means for imposing a co-axial restraint on the rotor shaft during operation, to keep the rotor assembly in proper operating position.

5. A device as in claim 4, in which said axial restraining means includes a pivoted cantilever swivel arm carrying a unitary ball bearing at its free end, with the ball located on the arm to be in co-axial alignment with the rotor shaft in operating positions.

* * * * *